US012639067B2

(12) United States Patent
Hicks et al.

(10) Patent No.: US 12,639,067 B2
(45) Date of Patent: May 26, 2026

(54) CODE COMMENT QUALITY ASSURANCE

(71) Applicant: INTERNATIONAL BUSINESS MACHINES CORPORATION, Armonk, NY (US)

(72) Inventors: Andrew C. M. Hicks, Highland, NY (US); Ryan Lo, Poughkeepsie, NY (US); Selvi John, Bangalore (IN); Santosh Rajashekar, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 108 days.

(21) Appl. No.: 18/397,205

(22) Filed: Dec. 27, 2023

(65) Prior Publication Data

US 2025/0217136 A1     Jul. 3, 2025

(51) Int. Cl.
*G06F 8/73*         (2018.01)
(52) U.S. Cl.
CPC ...................................... *G06F 8/73* (2013.01)
(58) Field of Classification Search
CPC ......................................................... G06F 8/73
USPC ................................................. 717/120–123
See application file for complete search history.

(56) References Cited

U.S. PATENT DOCUMENTS 4,860,203 A * 8/1989 Corrigan ................... G06F 8/41
                                                          717/123
6,993,487 B2   1/2006 Bluvband 9,372,689 B2   6/2016 Frenkiel et al.
12,373,199 B2 * 7/2025 Dey .................... H04L 12/1831

FOREIGN PATENT DOCUMENTS

CN         120216012 A     6/2025

OTHER PUBLICATIONS

Steidl et al., "Quality Analysis of Source Code Comments", 2013, IEEE, pp. 83-92. (Year: 2013).*
Software Engineering, "What's wrong with comments that explain complex code?", 2015, retrieved from https://softwareengineering. stackexchange.com/ , 18 pages. (Year: 2015).*
Software Engineering, "Is a comment aligned with the element being commented a good practice?", 2021, retrieved from https:// softwareengineering.stackexchange.com/ , 8 pages. (Year: 2021).*
IBM, Find a Product, URL: https://www.ibm.com/products?types% 5B0%5D=software&mhsrc=ibmsearch_a&mhq=software, printed Dec. 13, 2023, 2 pages.

(Continued)

*Primary Examiner* — Ted T. Vo
(74) *Attorney, Agent, or Firm* — Onyx IP Group

(57)         ABSTRACT

Code comment quality assurance includes calculating a complexity of a code portion extracting, from the code portion, one or more comments associated with the code portion, converting the one or more comments into a set of text features, quantifying the set of text features, determining, for the one or more comments, alignment between the one or more comments and the associated code portion using the quantifications of the set of text features and the complexity of the code portion, and triggering a notification responsive to the determination that the one or more comments and the associated code portion are misaligned.

20 Claims, 5 Drawing Sheets

(56) References Cited

OTHER PUBLICATIONS

Rani et al., A decade of code comment quality assessment: A systematic literature review, Journal of Systems and Software, vol. 195, 2023, 111515, https://doi.org/10.1016/j.jss.2022.111515, dated Jan. 2023, 22 pages.
ScienceDirect, Program Comprehension, Advances in Computers, 2002, URL: https://www.sciencedirect.com/topics/computer-science/program-comprehension, Elsevier, printed Dec. 13, 2023, 10 pages.
ScienceDirect, Programming Language, Programming Language Pragmatics (Third Edition), 2009, Elsevier, printed Dec. 13, 2023, 9 pages.
ScienceDirect, Software Engineering, Advances in Computer, 2014, URL: https://www.sciencedirect.com/topics/computer-science/software-engineering, Elsevier, printed Dec. 13, 2023, 10 pages.

* cited by examiner

100

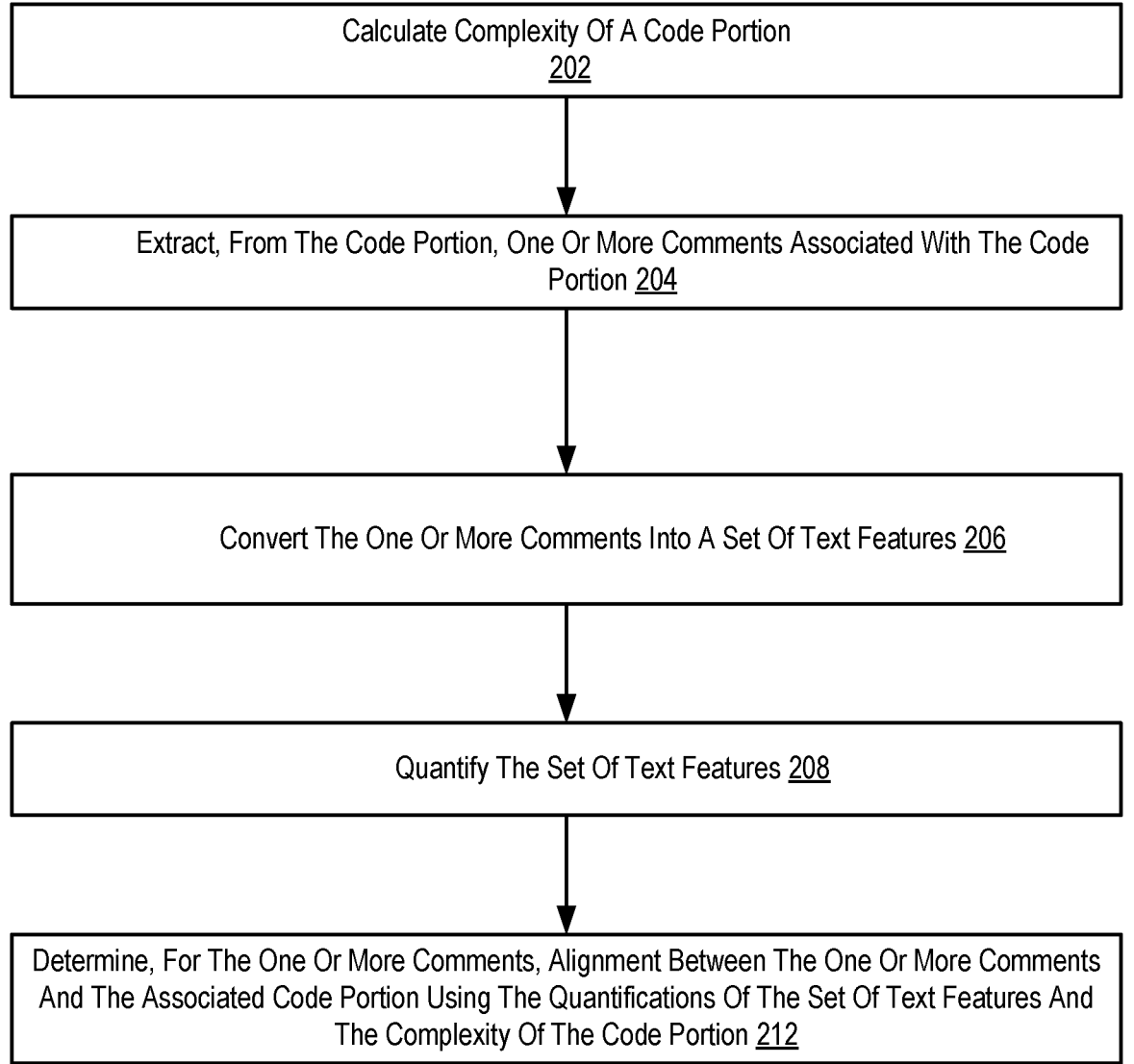

Calculate Complexity Of A Code Portion
202

Extract, From The Code Portion, One Or More Comments Associated With The Code Portion 204

Convert The One Or More Comments Into A Set Of Text Features 206

Quantify The Set Of Text Features 208

Determine, For The One Or More Comments, Alignment Between The One Or More Comments And The Associated Code Portion Using The Quantifications Of The Set Of Text Features And The Complexity Of The Code Portion 212

Trigger A Notification Responsive To A Prediction That The One Or More Comments And The Associated Code Portion Are Misaligned 214

FIG. 2

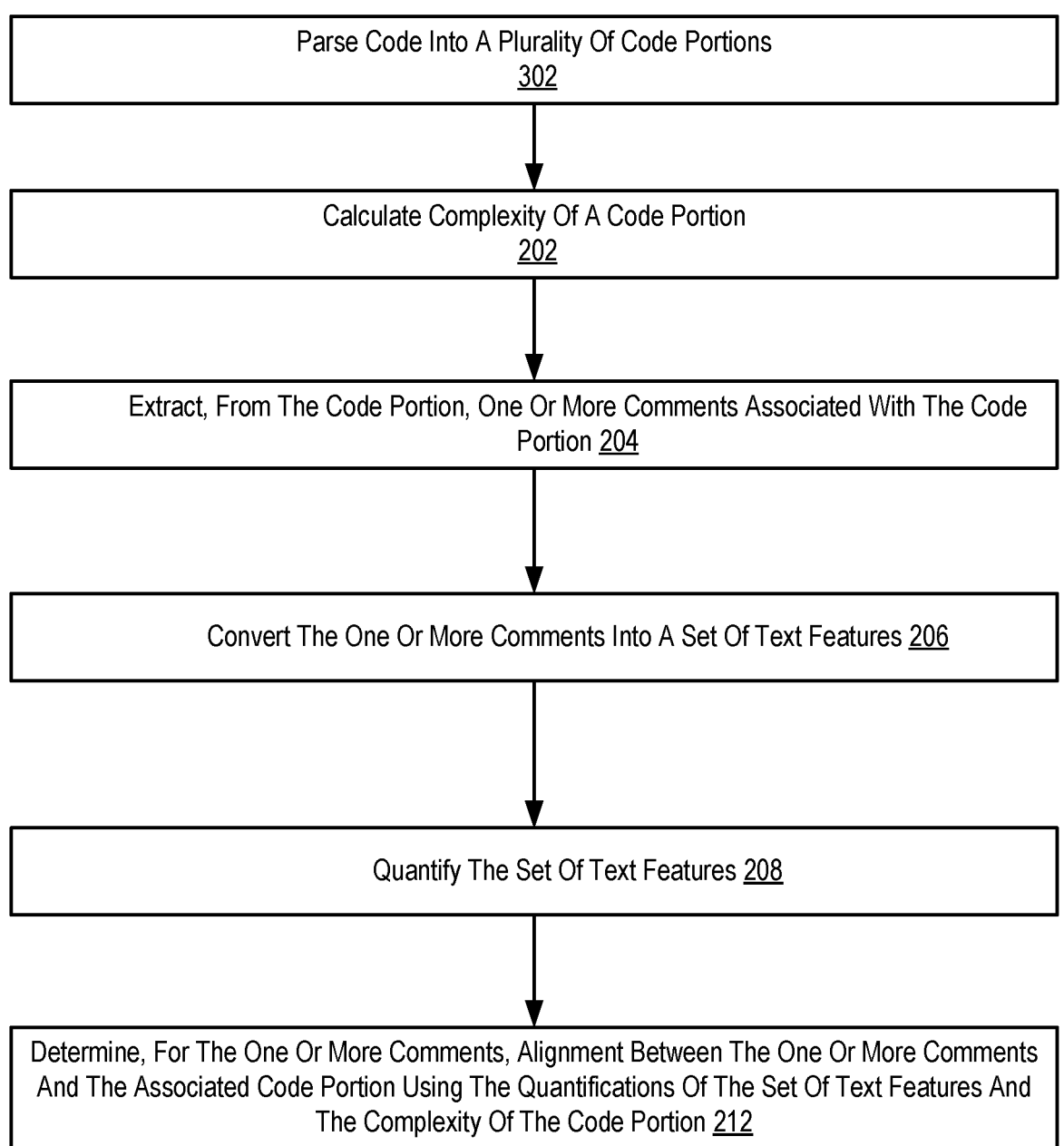

Parse Code Into A Plurality Of Code Portions
302

Calculate Complexity Of A Code Portion
202

Extract, From The Code Portion, One Or More Comments Associated With The Code Portion 204

Convert The One Or More Comments Into A Set Of Text Features 206

Quantify The Set Of Text Features 208

Determine, For The One Or More Comments, Alignment Between The One Or More Comments And The Associated Code Portion Using The Quantifications Of The Set Of Text Features And The Complexity Of The Code Portion 212

Trigger A Notification Responsive To A Prediction That The One Or More Comments And The Associated Code Portion Are Misaligned 214

FIG. 3

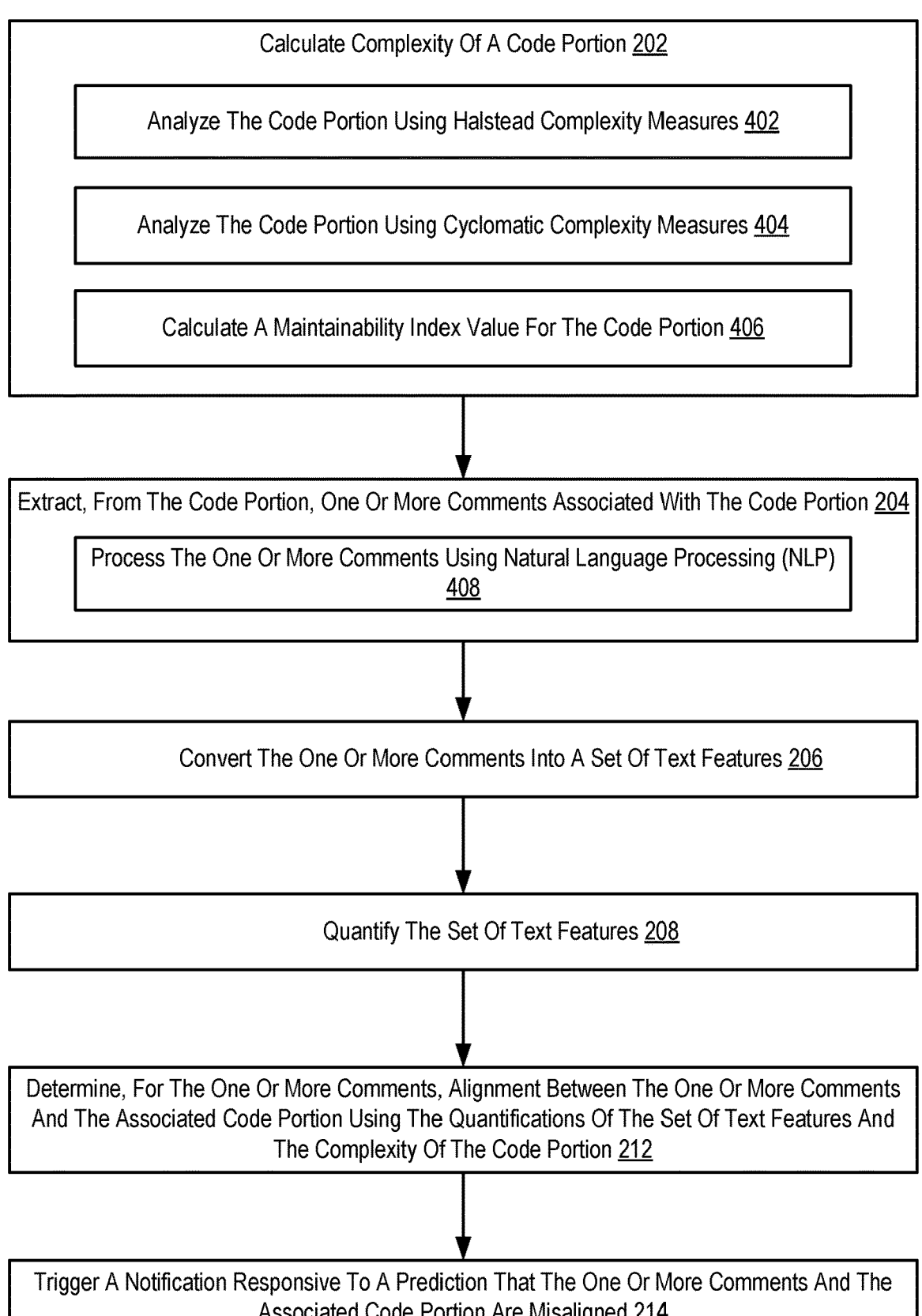

Calculate Complexity Of A Code Portion 202

Analyze The Code Portion Using Halstead Complexity Measures 402

Analyze The Code Portion Using Cyclomatic Complexity Measures 404

Calculate A Maintainability Index Value For The Code Portion 406

Extract, From The Code Portion, One Or More Comments Associated With The Code Portion 204

Process The One Or More Comments Using Natural Language Processing (NLP) 408

Convert The One Or More Comments Into A Set Of Text Features 206

Quantify The Set Of Text Features 208

Determine, For The One Or More Comments, Alignment Between The One Or More Comments And The Associated Code Portion Using The Quantifications Of The Set Of Text Features And The Complexity Of The Code Portion 212

Trigger A Notification Responsive To A Prediction That The One Or More Comments And The Associated Code Portion Are Misaligned 214

FIG. 4

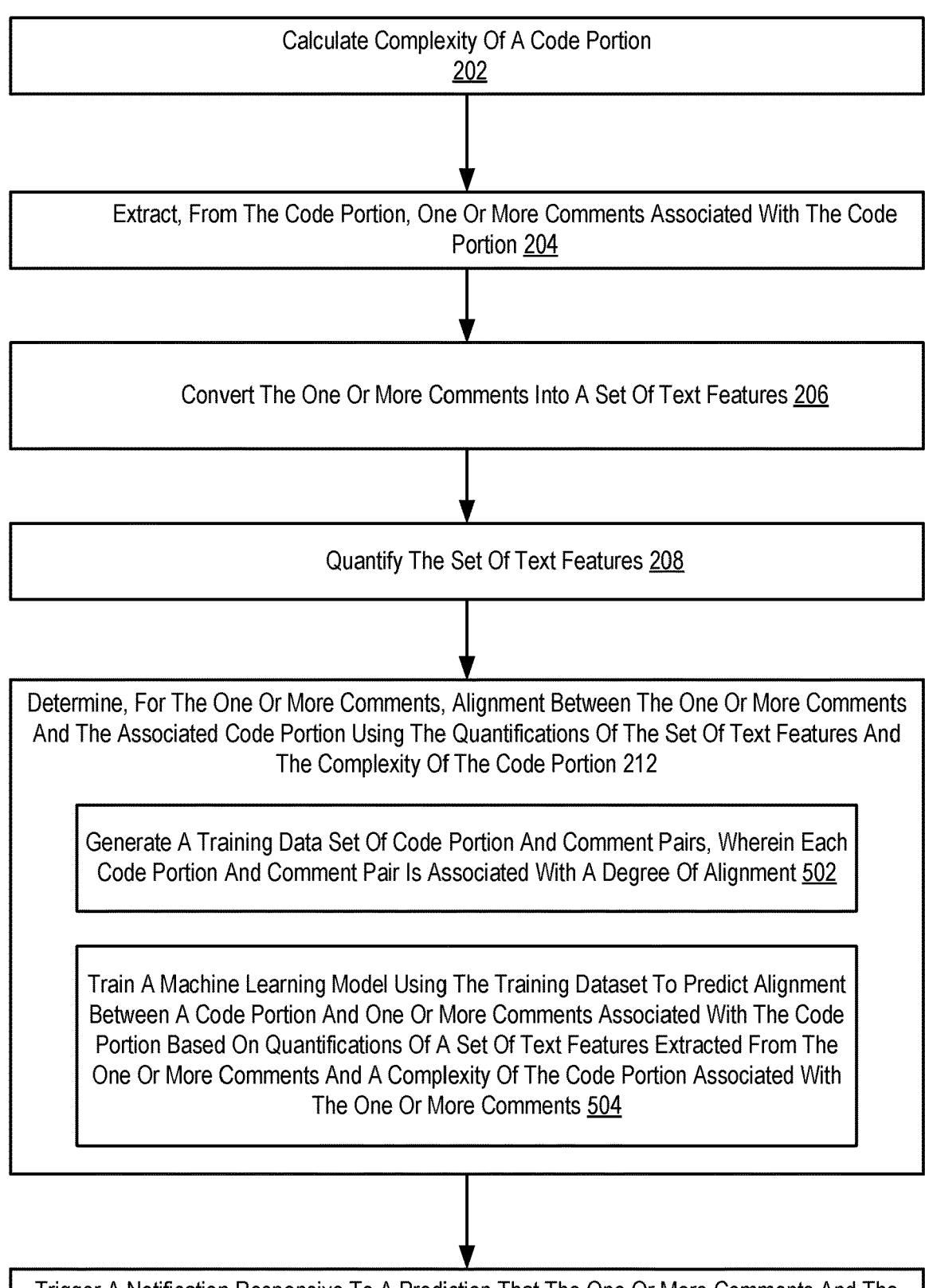

Calculate Complexity Of A Code Portion
202

Extract, From The Code Portion, One Or More Comments Associated With The Code Portion 204

Convert The One Or More Comments Into A Set Of Text Features 206

Quantify The Set Of Text Features 208

Determine, For The One Or More Comments, Alignment Between The One Or More Comments And The Associated Code Portion Using The Quantifications Of The Set Of Text Features And The Complexity Of The Code Portion 212

Generate A Training Data Set Of Code Portion And Comment Pairs, Wherein Each Code Portion And Comment Pair Is Associated With A Degree Of Alignment 502

Train A Machine Learning Model Using The Training Dataset To Predict Alignment Between A Code Portion And One Or More Comments Associated With The Code Portion Based On Quantifications Of A Set Of Text Features Extracted From The One Or More Comments And A Complexity Of The Code Portion Associated With The One Or More Comments 504

Trigger A Notification Responsive To A Prediction That The One Or More Comments And The Associated Code Portion Are Misaligned 214

FIG. 5

CODE COMMENT QUALITY ASSURANCE

BACKGROUND

The present disclosure relates to methods, apparatus, and products for code comment quality assurance.

In a complex software system, there may be a number of code files that each contain a number of code comments. As is known to those of skill in the art, code comments may be intended to explain, represent, or highlight one or more aspects of computer code. An author of the code comment (such as the author of the computer code) may intend for a code comment to provide useful background or explanatory information to a reader of the computer code (such as another computer programmer). Accordingly, code comments can take the form of an explanation, an example, or an illustration of the functionality embodied by the computer code. While computer code may be in a computer programming language (such as COBOL or Java), code comments may be in plain language (e.g., plain English). Readers will appreciate that while code comments are designed to represent or explain the code, the code comments may be of varying quality whereas for some code, there may even be a lack of code comments where a reader may benefit from the presence of comments. In other cases, the code comment may fail to fully represent or explain one or more aspects of the associated computer code, thereby limiting the usefulness of the code comment. Moreover, modern artificial intelligence systems may also generate code comments, but existing systems may fail to generate code comments that consistently provide a satisfactory explanation of the purpose and functionality of code segments.

SUMMARY

According to embodiments of the present disclosure, various methods, apparatuses and products for code comment quality assurance are described herein. In some aspects, code comment quality assurance includes calculating a complexity of a code portion extracting, from the code portion, one or more comments associated with the code portion, converting the one or more comments into a set of text features, quantifying the set of text features, determining, for the one or more comments, alignment between the one or more comments and the associated code portion using the quantifications of the set of text features and the complexity of the code portion, and triggering a notification responsive to the determination that the one or more comments and the associated code portion are misaligned.

BRIEF DESCRIPTION OF THE DRAWINGS

FIG. 2 sets forth a flowchart of an example method for code comment quality assurance in accordance with some embodiments of the present disclosure.

FIG. 3 sets forth a flowchart of another example method for code comment quality assurance in accordance with some embodiments of the present disclosure.

FIG. 4 sets forth a flowchart of another example method for code comment quality assurance in accordance with some embodiments of the present disclosure.

FIG. 5 sets forth a flowchart of another example method for code comment quality assurance in accordance with some embodiments of the present disclosure.

DETAILED DESCRIPTION

Figure 1:
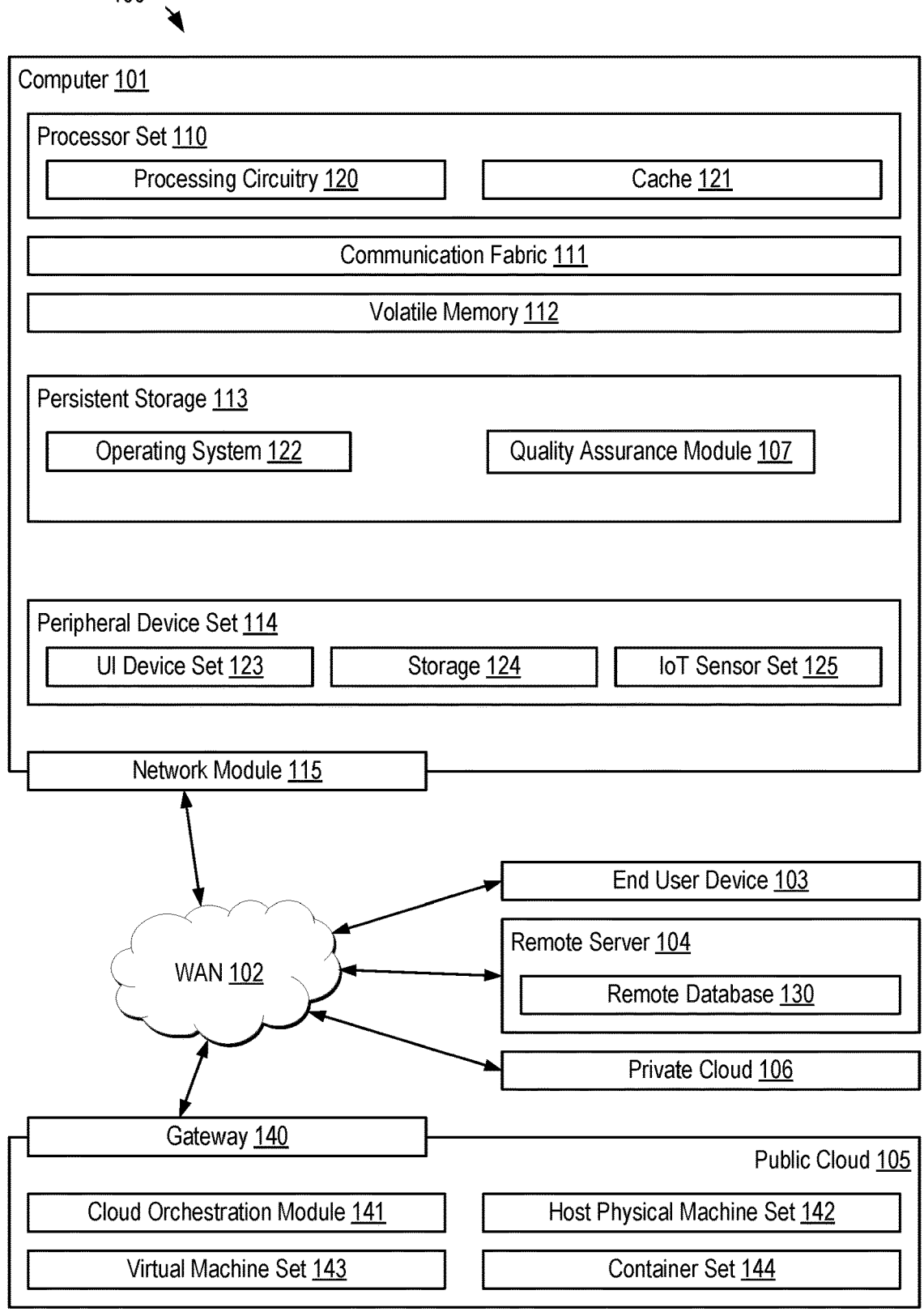
FIG. 1 sets forth a block diagram of an example computing environment for code comment quality assurance in accordance with some embodiments of the present disclosure.

The following disclosure describes exemplary embodiments for code comment quality assurance. In some embodiments, the described systems analyze correlations between human language and computer code. As described herein, human language or plain language can be exemplified by any spoken, written, or expressed language (e.g., English, Japanese, American Sign Language, and so on). Examples of computer code include any computer-readable code composed in one or more programming languages, such as computer code written in Java, C++, COBOL, or the like. Analyzing correlations between human language and computer code can include analyzing the content of a portion of computer code and the content of any associated code comments that are written in plain language.

With reference now to FIG. 1, shown is an example computing environment according to aspects of the present disclosure. Computing environment 100 contains an example of an environment for the execution of at least some of the computer code involved in performing the various methods described herein, such as quality assurance module 107. Quality assurance module 107 may be configured to determine aspects of computer code and associated code comments, such as code complexity levels or code comment features, and identify correlations between the computer code and the code comments. Based on the identified correlations or degrees of correlation, quality assurance module 107 can predict or determine a level of alignment between the computer code and the code comment. If the code comment is predicted to be misaligned relative to the computer code, quality assurance module 107 can trigger an alert or notification that prompts, for example, a human user or an artificial intelligence system to generate a code comment that is more closely aligned with the computer code.

In addition to block 107, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 107, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/ or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document. These computer readable program instructions are stored in various types of computer readable storage media, such as cache 121 and the other storage media discussed below. The program instructions, and associated data, are accessed by processor set 110 to control and direct performance of the computer-implemented methods. In computing environment 100, at least some of the instructions for performing the computer-implemented methods may be stored in block 107 in persistent storage 113.

Communication fabric 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 107 typically includes at least some of the computer code involved in performing the computer-implemented methods described herein.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database), this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the computer-implemented methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

FIG. 2 sets forth a flowchart of an example method for code comment quality assurance in accordance with some embodiments of the present disclosure. The method of FIG. 2 may be performed, for example, by the quality assurance module 107 of FIG. 1. In some embodiments, the quality assurance module 107 may be implemented as a process or service separate from an application or software implementing code comment quality assurance. For example, the quality assurance module 107 may be implemented by an operating system or other software that monitors the behavior and execution of an application implementing code comment quality assurance. As another example, in some embodiments, the quality assurance module 107 may be implemented as a process or service that applies updates or patches to applications or code capable of implementing code comment quality assurance, or as a process or service that monitors or detects updates or patches to applications or code capable of code comment quality assurance.

The method of FIG. 2 includes calculating 202 complexity of a code portion. Calculating 202 complexity of a code portion can be carried out in several ways. In one embodiment, calculating a complexity of a code portion can involve analyzing a code portion and determining one more measures of complexity. These measures of complexity may represent various aspects of code complexity such as various code intricacies, code readability, code maintainability, or the like. For example, well-established metrics can be used such as cyclomatic complexity methods, Halstead methods, maintainability index methods, or the like.

The complexity measures can represent a number of code lines, a number of operators or operands, a number of linearly independent or dependent paths through code logic, branching complexity, data access complexity, data flow complexity, measures determining class inheritance (e.g., depth) or number of children or dependent classes, cohesion of class methods, or the like. Readers will appreciate that code complexity may be defined through many different methods and combinations of methods whereby the different methods or combinations will produce one or more complexity measures that can be recorded and associated with a code portion. Moreover, these complexity measures can be used to compare one code portion to another code portion and also to analyze the quality of a code comment associated with the code portion.

In one embodiment, one or more of these methods can provide a measure, representation, or quantification of the complexity of a code portion in terms of a magnitude value representing code complexity. The magnitude value can be expressed in terms of a range, a grade, a value, a ranking, a percentile value, or the like. The magnitude value can be, for example, an eigenvector that includes one or more eigenvalues. For example, quality assurance module 107 can be configured to receive or select a code portion, identify computer code text within the code portion, and execute one or more code complexity measurement functions that produce a magnitude value that indicates a code complexity for the code portion. The functions may, for example, convert the code portion into a matrix that can then be decomposed to obtain an eigenvector that includes one or more eigenvalues, where the eigenvector represents the magnitude of code complexity for the code portion.

The method of FIG. 2 also includes extracting 204, from the code portion, one or more comments associated with the code portion. Extracting 204, from the code portion, one or more comments associated with the code portion can be carried out by, for example, searching for and identifying a special character that denotes code comments. Extracting 204, from the code portion, one or more comments associated with the code portion can be carried out by looking at a particular section of the code file, such as a file header or a certain number of lines that are the beginning of a code file or the end of a code file, and so on.

Extracting 204, from the code portion, one or more comments associated with the code portion can be carried out by identifying some other feature. For example, in a code portion, code comments may be in a different color or font or have some other distinguishing format feature. Code comments may have a different indentation or other placement feature compared to computer code. Moreover, while the above examples indicate that code comments are extracted from the same file or object that stores computer code as well, in other example, code comments may be in separate files or objects or data stores compared to the computer code. Accordingly, extracting one or more comments associated with the code portion can also include obtaining the code comments from the separate file or file section.

The method of FIG. 2 also includes converting 206 the one or more comments into a set of text features. Converting 206 the one or more comments into a set of text features can include decomposing comment text into one or more subcomponents or constituent parts. For example, quality assurance module 107 can be configured to decompose the comment text by parts of speech, such as by nouns, verbs, adjectives, or the like. Other text features can be identified such as word count, punctuation, spacing, formatting, or the like. Moreover, a number of distinct comments for a particular code portion can be determined as well. Additionally, other distinguishing aspects of the code that are indicated by the comments can be identified, such as code version identifiers, code author identifiers, and any other code portion metadata (such as whether the code portion is part of a certain software module).

The method of FIG. 2 also includes quantifying 208 the set of text features. Quantifying 208 the set of text features can include, for example, determining a count or some other statistical measure of one or more of the subcomponents by type, such as a number of nouns in the comment, a number of verbs in the comment, and so on. Linguistic features of the code can also be extracted and quantified using natural language processing (NLP) techniques, as will be described further below with respect to FIG. 4. As one example of this extraction, the extraction may be performed using regular expressions. Moreover, natural language processing techniques may be employed to dissect the content of code comments. Linguistic features such as parts of speech (nouns, verbs, adjectives), grammatical aspects (phrases, clauses, sentence structure) and other features (punctuation, indentation, special characters, references to other comments) may be extracted and analyzed. These features may be quantified in various ways (e.g., as counts, averages, or other statistical measures). The quantification of these features may be converted into specific comment quantification values. For example, a quantity of a certain feature may be squared, summed, and then square-rooted to derive one or more comment quantification values for the comments.

The method of FIG. 2 also includes determining 210, for the one or more comments, alignment between the one or more comments and the associated code portion using the quantifications of the set of text features and the complexity of the code portion. Determining, for the one or more comments, alignment between the one or more comments and the associated code portion can be carried out by an integrated analysis of the magnitude values created for the code portion and the comment quantification values for the code comments. As an example of the abovementioned integrated analysis, quality assurance module 107 can determine, for example, that a code portion refers to a certain number of items (e.g., a data object), such as 7 items. Quality assurance module can then determine whether the associated code comments include references to 7 items (e.g., the same 7 items) or not. For example, the code comments may include 7 descriptors such as nouns that each refer to an item that is part of the code portion.

An integrated analysis of the magnitude values created for the code portion and the comment quantification values for the code comments can also be carried out in other ways. For example, the magnitude values created for the code portion and the comment quantification values for the code comments can be considered X-Y coordinates and plotted as such on a graph (e.g., the code portion magnitude values denoted by values on the x-axis and the comment quantification values for the code comments denoted by values on the y-axis). Each of the X-Y points can represent a correlated code-comment pair. In some embodiments, a reference line may be included on the graph, such as Y=X, denoting 100% alignment or correlation between the magnitude values created for the code portion and the comment quantification values for the code comments. Readers will appreciate that the closer a point is to the Y=X, the greater the correlation may be said to be between the code portion and the comment.

Moreover, the magnitude values created for the code portion and the comment quantification values for the code comments can be plotted as raw values as in the example above, or different operations can be applied to one or both sets of values to facilitate analysis. For example, one or both of the sets of values can be weighted, normalized, or be processed using other statistical functions or operations (e.g., taking a floor of a value, or taking an absolute value). The processed values that result from application of one or more of these operations can then be plotted using the graph that is described above.

In some embodiments, the integrated analysis can result in a determination of a quality of a comment in a code-comment pair. For example, using the abovementioned graphing method, quality assurance module 107 may determine a closeness of a point (corresponding to a code-comment pair) to the Y=X line that represents 100% alignment between a code portion and its corresponding comment. Based on the determined closeness, or via other measures, quality assurance module 107 can determine that a comment has a specific alignment, relevance, or correspondence to the code portion. In one embodiment, code comments can be assigned an objective quality measure, such as on a scale of 1 to 10.

The method of FIG. 2 also includes triggering 212 a notification responsive to a determination that the one or more comments and the associated code portion are misaligned. Triggering 212 a notification responsive to a determination that the one or more comments and the associated code portion are misaligned can be carried out by quality assurance module 107 providing a message to a user (or a computer module) indicating a misalignment and/or a degree or misalignment between the code portion and the code comment. In another example, the notification can take the form of the code-comment pair being visually highlighted (e.g., on a graph that plots code-comment pairs as coordinates), or can take the form of an alert or warning in a comment review dashboard, or the like.

FIG. 3 sets forth a flowchart of another example method for code comment quality assurance in accordance with some embodiments of the present disclosure. The method of FIG. 3 is similar to FIG. 2 in that the method of FIG. 3 includes calculating 202 a complexity of a code portion, extracting 204, from the code portion, one or more comments associated with the code portion, converting 206 the one or more comments into a set of text features, quantifying 208 the set of text features, determining 212, for the one or more comments, alignment between the one or more comments and the associated code portion using the quantifications of the set of text features and the complexity of the code portion, and triggering 214 a notification responsive to the determination that the one or more comments and the associated code portion are misaligned.

The method of FIG. 3 differs from the method of FIG. 2 in that the method of FIG. 3 also includes parsing 302 code into a plurality of code portions. Parsing code into a plurality of code portions can be carried out by, for example, parser module that is part of or associated with quality assurance module 107. The parser can break down a code file into one or more code portions. Each code file can be lexically analyzed to convert code text into one or more pieces that can be referred to as tokens. The lexical analysis can, for example, determine certain break points within the code file at which point some code text can be separated from other code text in order to form portions. For example, certain characters may be used as delimiters (e.g., the curly bracket '{' or '}' characters).

FIG. 4 sets forth a flowchart of another example method for code comment quality assurance in accordance with some embodiments of the present disclosure. The method of FIG. 4 is similar to FIG. 2 in that the method of FIG. 4 includes calculating 202 a complexity of a code portion, extracting 204, from the code portion, one or more comments associated with the code portion, converting 206 the one or more comments into a set of text features, quantifying 208 the set of text features, determining 212, for the one or more comments, alignment between the one or more comments and the associated code portion using the quantifications of the set of text features and the complexity of the code portion, and triggering 214 a notification responsive to the determination that the one or more comments and the associated code portion are misaligned.

The method of FIG. 4 differs from the method of FIG. 2 in that the method of FIG. 4 also includes analyzing 402 the code portion using Halstead complexity measures. Halstead complexity measures can, in some examples, represent measures of code complexity that represent algorithms implemented in the code independently of code execution. Analyzing 402 the code portion using Halstead complexity measures can include calculating, by quality assurance module 107, Halstead complexity measures statically from a code portion.

In some embodiments, calculating Halstead complexity measures can include determining one or more quantities, such as a number of distinct operators in the code portion, a number of distinct operands in the code portion, and the like. Using these determined quantities, quality assurance module 107 can be configured to calculate one or more Halstead complexity measures, such as a program length. In this scenario, program length may refer not to a number of lines of code but to, for example, the sum of the total number of operators and the total number of operands). Other Halstead complexity measures may include a difficulty measure, such as product or ratio or combination thereof that uses the number of distinct operators or operands to represent a degree of difficulty in writing or understanding the program. Still other Halstead complexity measures can include time or effort required to write or understand the code, a number of possible bugs in the code, and so on. In some embodiments, quality assurance module 107 can be configured to generate one or more of the abovementioned Halstead complexity measures or other Halstead complexity measures for a code portion. The resulting Halstead complexity measures can be used as the abovementioned code portion magnitude values.

The method of FIG. 4 also includes analyzing 404 the code portion using cyclomatic complexity measures. Analyzing 404 the code portion using cyclomatic complexity measures can be carried out by quality assurance module 107 determining a control flow graph of a code portion. A control flow graph can refer to a graph data structure where nodes of the graph correspond to indivisible groups of commands of a code portion. The graph can include directed edges between nodes. A directed edge leading from a first node to a second node can be found where, for example, commands of the second node are to be executed immediately after commands of the first node. Moreover, quality assurance module 107 can be configured to identify a number of linearly independent paths through nodes of the code portion can represent a cyclomatic complexity of the program. This number can be used as a magnitude value representing a code complexity for a code portion.

The method of FIG. 4 also includes calculating 406 a maintainability index value for the code portion. Calculating 406 a maintainability index value for the code portion can include quality assurance module 107 determining various measures for a code portion, such as lines of code in the code portion. Such metrics can indicate a level of complexity in terms of, for example, an amount of time or effort required to maintain a certain code portion (e.g., in terms of man-hours).

The method of FIG. 4 also includes processing 408 the one or more comments using natural language processing (NLP) techniques. Processing 408 the one or more comments using natural language processing (NLP) techniques can be carried out by quality assurance module 107 in order to determining the meaning or value of linguistic features of a code comment. For example, NLP techniques such as morphological analysis, syntactic analysis, lexical semantic analysis, relational semantics, discourse analysis, and others can be used. Moreover, techniques such as part of speech tagging can be used to mark up or categorize particular words in the comment.

FIG. 5 sets forth a flowchart of another example method for code comment quality assurance in accordance with some embodiments of the present disclosure. The method of FIG. 5 is similar to FIG. 2 in that the method of FIG. 5 includes calculating 202 a complexity of a code portion, extracting 204, from the code portion, one or more comments associated with the code portion, converting 206 the one or more comments into a set of text features, quantifying 208 the set of text features, determining 212, for the one or more comments, alignment between the one or more comments and the associated code portion using the quantifications of the set of text features and the complexity of the code portion, and triggering 214 a notification responsive to the determination that the one or more comments and the associated code portion are misaligned.

The method of FIG. 5 differs from the method of FIG. 2 in that the method of FIG. 5 also includes generating 502 a training data set of code portion and comment pairs, wherein each code portion and comment pair is associated with a degree of alignment. In one embodiment, a training dataset may be created, with code-comment pairs such as those described above with respect to FIG. 2. As described above, the code-comment pairs can be assigned a comment quality measure, such as 1 to 10 on a quality scale. In some embodiments, the scale may be determined by, for example, a relative magnitude ratio or other comparative measure between the code complexity magnitude values (e.g., Halstead metrics indicating code complexity), and the comment feature magnitude values.

The method of FIG. 5 also includes training 504 a machine learning model using the training dataset to predict alignment between a code portion and one or more comments associated with the code portion based on quantifications of a set of text features extracted from the one or more comments and a complexity of the code portion associated with the one or more comments. The training dataset can then be an input to a machine-learning model, such as a linear regression model. The model can provide outputs such as a rank for a particular comment based on comment quality, thereby providing an automated, data-driven approach to comment quality evaluation. Moreover, the process may be iterative. More specifically, the performance of the machine learning model can be reviewed and refined iteratively in order to reweigh the parameters that created the comparative measures (e.g., magnitude ratio) between the code complexity magnitude values and comment feature magnitude values.

Given these comment quality scores, the machine learning model outputs trained on the code-comment pairs can then be used to determine comment quality of other comments. For example, a code-comment pair that is not part of the training dataset can be used as an input to the machine learning model, where the model can then output a rank for the comment of the code-comment pair, representing comment quality.

Readers will appreciate that artificial intelligence (AI) systems, particularly those backed by large language models (LLMs) can be used to generate code as well as generate code comments, and these artificial intelligence systems can benefit from the systems and methods described above. In an example implementation, an AI system may generate code comments that are then input into the abovementioned machine learning model to obtain an indicator (e.g., a rank)

of the comment's quality. The quality measure can be an input to the AI system as a way of improving the AI system's performance. For example, where comments are ranked on a scale of 1-10, the comment's rank can be input into the AI system using a particular prompt that prompts the AI system to, for example, generate a comment having certain improvements compared to the one the AI system initially generated. For example, the AI system can be prompted to generate a more verbose comment.

Moreover, in cases where AI systems are generating code based on other code, the above systems and methods can offer additional improvements. As an example, an AI system may take COBOL code as input and translate or convert it into Java code. During the process of Java code generation, the AI system may also generate code comments. One or more of the generated code comments can be analyzed using, for example, the abovementioned machine learning model to determine the comment's quality. The AI system can then be prompted to generate an improved comment as part of its Java code generation process. In some cases, no comment may be generated, so the AI system can be prompted to generate a code comment for a code portion where no comment was generated during the Java code generation.

In certain other cases where new code is being generated from existing code, it may be observed that the quality of comments in the existing code can impact the quality of the new code that is being generated. For example, AI system may be configured to take as input the existing code, such as existing COBOL code, and also take as input the code comments in the existing COBOL code. Readers will appreciate that in such cases, improved comments in the existing COBOL code can result in improvements to the Java code that is being generated. Moreover, code comments may be missing for certain code portions in the COBOL code. Accordingly, the AI system may be prompted to generate comments for the COBOL code. For example, where comments already exist, the AI system may be prompted to generate comments for code portions that do not have code comments, or more detailed code comments in place of existing comments, or additional comments that are in addition to existing code comments for code portions. The generated code comments can then be used by the AI system in its code generation process.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of code comment quality assurance, comprising:

calculating complexity of a code portion;

extracting, from the code portion, one or more comments associated with the code portion;

converting the one or more comments into a set of text features;

quantifying the set of text features;

training a machine learning model, using training data set of code portion and comment pairs, to predict alignment between the code portion and the one or more comments associated with the code portion based on quantifications of the set of text features from the one or more comments and a complexity of the code portion associated with the one or more comments, wherein each code portion and comment pair is associated with a degree of alignment;

determining, for the one or more comments, alignment between the one or more comments and the code portion using the machine learning model, quantifications of the set of text features, and the complexity of the code portion; and triggering a notification responsive to a determination that the one or more comments and the code portion are misaligned.

2. The method of claim 1, further comprising parsing code into a plurality of code portions.

3. The method of claim 1, wherein calculating complexity of a code portion further comprises analyzing the code portion using Halstead complexity measures.

4. The method of claim 1, wherein calculating complexity of a code portion further comprises analyzing the code portion using cyclomatic complexity measures.

5. The method of claim 1, wherein calculating complexity of a code portion further comprises calculating a maintainability index value for the code portion.

6. The method of claim 1, wherein extracting, from the code portion, the one or more comments associated with the code portion further comprises processing the one or more comments using natural language processing (NLP).

7. The method of claim 1, wherein the one or more code comments comprise comments generated by an artificial intelligence system.

8. The method of claim 7, wherein the code portion comprises a code portion generated by the artificial intelligence system.

9. The method of claim 1, further comprising generating the training data set of code portion and comment pairs, wherein each code portion and comment pair is associated with a degree of alignment.

10. An apparatus comprising:

a processing device; and memory operatively coupled to the processing device, wherein the memory stores computer program instructions that, when executed, cause the processing device to:

calculate complexity of a code portion;

extract, from the code portion, one or more comments associated with the code portion;

convert the one or more comments into a set of text features;

quantify the set of text features;

train a machine learning model, using training data set of code portion and comment pairs, to predict alignment between the code portion and the one or more comments associated with the code portion based on quantifications of the set of text features from the one or more comments and a complexity of the code portion associated with the one or more comments, wherein each code portion and comment pair is associated with a degree of alignment;

determine, for the one or more comments, alignment between the one or more comments and the code portion using the machine learning model, quantifications of the set of text features, and the complexity of the code portion; and trigger a notification responsive to a determination that the one or more comments and the code portion are misaligned.

11. The apparatus of claim 10, wherein the memory further stores computer program instructions to parse code into a plurality of code portions.

12. The apparatus of claim 10, wherein the instructions to calculate complexity of a code portion further comprise instructions to analyze the code portion using Halstead complexity measures.

13. The apparatus of claim 10, wherein the instructions to calculate complexity of a code portion further comprise instructions to analyze the code portion using cyclomatic complexity measures.

14. The apparatus of claim 10, wherein the instructions to calculate complexity of a code portion further comprise instructions to calculate a maintainability index value for the code portion.

15. A computer program product comprising a computer readable storage medium, wherein the computer readable storage medium comprises computer program instructions that, when executed:

calculate complexity of a code portion;

extract, from the code portion, one or more comments associated with the code portion;

convert the one or more comments into a set of text features;

quantify the set of text features;

train a machine learning model, using training data set of code portion and comment pairs, to predict alignment between the code portion and the one or more comments associated with the code portion based on quantifications of the set of text features from the one or more comments and a complexity of the code portion associated with the one or more comments, wherein each code portion and comment pair is associated with a degree of alignment;

determine, for the one or more comments, alignment between the one or more comments and the code portion using the machine learning mode, quantifications of the set of text features, and the complexity of the code portion; and trigger a notification responsive to a determination that the one or more comments and the code portion are misaligned.

16. The computer program product of claim 15, wherein the computer readable storage medium further stores computer program instructions to parse code into a plurality of code portions.

17. The computer program product of claim 15, wherein the computer program instructions to calculate complexity of a code portion further comprise instructions to analyze the code portion using Halstead complexity measures.

18. The computer program product of claim 15, wherein the computer program instructions to calculate complexity of a code portion further comprise instructions to analyze the code portion using cyclomatic complexity measures.

19. The computer program product of claim 15, wherein the computer program instructions to calculate complexity of a code portion further comprises instructions to calculate a maintainability index value for the code portion.

20. The computer program product of claim 15, wherein the computer readable storage medium further stores computer program instructions to generate the training data set of code portion and comment pairs.

\*   \*   \*   \*   \*